Oct. 19, 1965  KANICHI SUIZU  3,212,375
METHOD AND APPARATUS FOR WORKING A JOINT LINE
BETWEEN A PAIR OF INTERSECTING PIPES
Filed Sept. 13, 1963  2 Sheets-Sheet 1
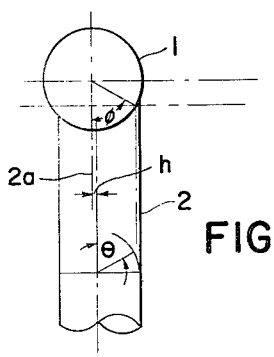
FIG. 1a
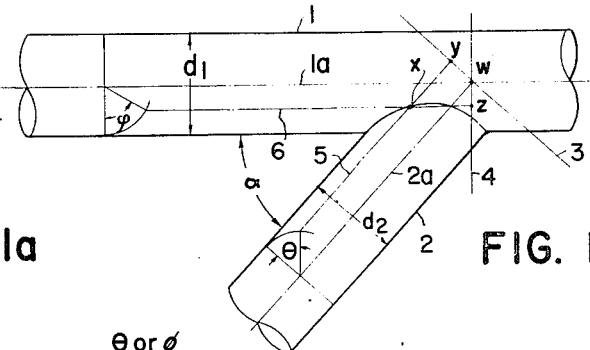
FIG. 1
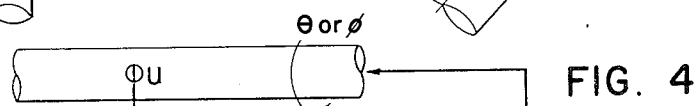
FIG. 4
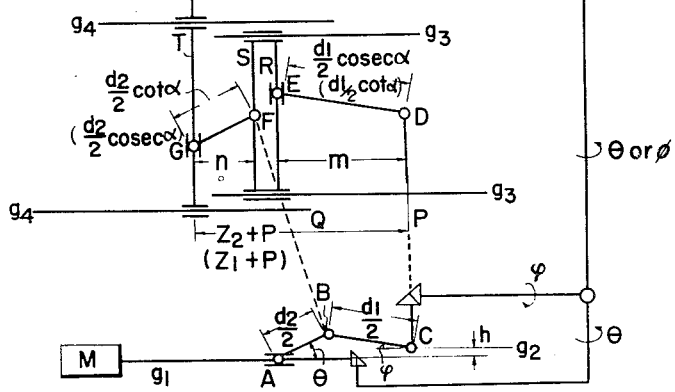
FIG. 6
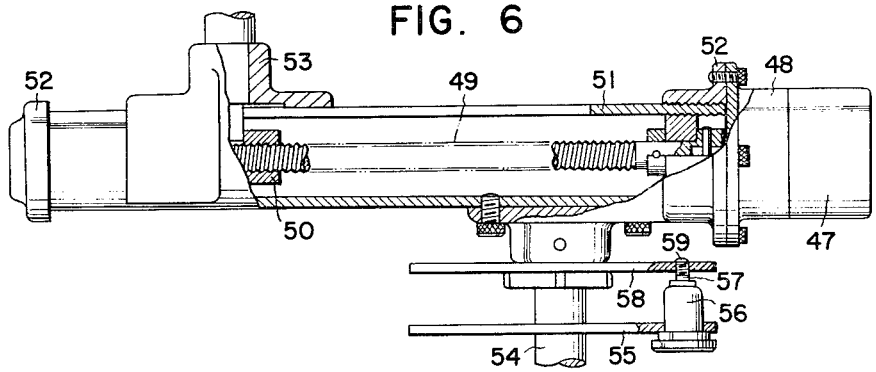
INVENTOR.
Kanichi Suizu
BY
Robert E. Burns
Attorney Oct. 19, 1965  KANICHI SUIZU  3,212,375
METHOD AND APPARATUS FOR WORKING A JOINT LINE
BETWEEN A PAIR OF INTERSECTING PIPES
Filed Sept. 13, 1963  2 Sheets-Sheet 2

INVENTOR.
Kanichi Suizu,
BY
Attorney

United States Patent Office 3,212,375
Patented Oct. 19, 1965

3,212,375
METHOD AND APPARATUS FOR WORKING A JOINT LINE BETWEEN A PAIR OF INTERSECTING PIPES
Kanichi Suizu, Tarumi-ku, Kobe-shi, Japan, assignor to Kawasaki Jukogyo Kabushiki Kaisha, Kobe-shi, Japan, a joint-stock company of Japan
Filed Sept. 13, 1963, Ser. No. 308,894
Claims priority, application Japan, Jan. 21, 1963, 38/2,860, 38/2,861; Mar. 22, 1963, 38/15,053
4 Claims. (Cl. 82—47)

This invention relates to a motor operated pipe cutting machine and more particularly to a method and apparatus for cutting a pair of pipes in the configuration of a curved joint line along which the pair of pipes are to be joined at an angle.

The principal object of this invention is to provide a method of accurately and automatically working or cutting a pair of pipes or cylinders in the configuration of a joint line along which the pair of pipes or cylinders are to be joined.

Another object of this invention is to provide an improved apparatus for accurately and automatically cutting the said pipes along said joint line.

Still another object of this invention is to provide a novel motor-operated lever mechanism for automatically setting the length of the lever to provide a function which represents the above said joint line.

Briefly stated, the method embodying the principle of this invention comprises the steps of representing the connecting line by an analytic function, $Z=f(\theta.\varphi)$, of the circular cylindrical coordinates utilizing the axes of first and second pipes which are to be joined along said joint line as the coordinate axes, $\theta$ and $\varphi$ being angular variables having a relation represented by the equation.

$$\frac{d_2}{2}\sin\theta = \frac{d_1}{2}\sin\varphi + h$$

wherein $d_1$ and $d_2$ represent the diameters of said first and second pipes, respectively, and $h$ represents the perpendicular distance between the axes of said first and second pipes; obtaining the value of said function by utilizing a mechanism including a combination of levers, mounting a working tool on the output shaft of said mechanism, moving said working tool along a straight line in the direction of the axis of the pipe to be worked, rotating said pipe to be worked or said working tool at an angle of $\theta$ or $\phi$ whereby to work said joint line; and automatically setting the length of said levers by means of electric power means.

The apparatus constructed in accordance with this invention for working a joint line between first and second pipes which are to be joined together at an angle along said joint line comprises a mechanism including a combination of levers for obtaining a function $Z=f(\theta.\varphi)$ of the circular cylindrical coordinates utilizing the axes of said first and second pipes as the coordinate axes to represent said joint line, where $\theta$ and $\varphi$ are angular variables and have a relation therebetween represented by an equation $$\frac{d_2}{2}\sin\theta = \frac{d_1}{2}\sin\varphi - h$$

wherein $d_1$ and $d_2$ represent the diameters of the first and second pipes, respectively, and $h$ represents the perpendicular distance between the axes of said first and second pipes; a working tool mounted on the output shaft of said lever mechanism, means to move said working tool along a straight line in the direction of the axis of first pipe to be worked, means to rotate said first pipe to be worked or said working tool at an angle of $\theta$ or $\varphi$ whereby to work said joint line and electric means to automatically set the length of said levers.

The features of the invention which are believed to be novel are set forth with particularity in the appended claims. The invention itself, however, as to principle together with organization and advantages thereof may, best be understood by reference to the following description taken in connection with the accompanying drawing, in which:

FIG. 1 is a side view showing a pair of interconnected pipes for the purpose of mathematically analysing the joint line between the two pipes;

FIG. 1a is an end view of the pipes shown in FIG. 1;

FIG. 4 is a schematic diagram showing the arrangement of a lever mechanism adapted to work the joint line;

FIG. 6 is a side view, partly in section, and with parts cut away, showing a portion of the embodiment shown in FIG. 5.

Figure 2:
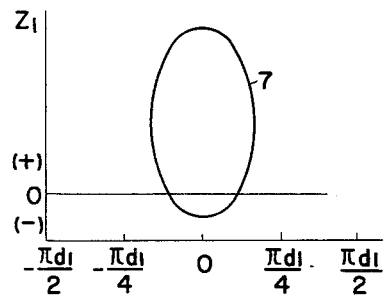
FIGS. 2 and 3 are graphical representations showing developments of said joint line with respect to the main and auxiliary pipes, respectively.
Figure 3:
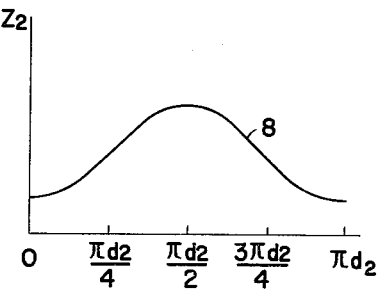

Referring now to FIGS. 1 to 3, the function representing joint, line on the basis of circular cylindrical coordinates will first be considered.

As shown in FIG. 1 a main or first pipe 1 with an axis $1a$ and an auxiliary or second pipe 2 with an axis $2a$ are intersecting at an angle. In FIG. 1, the following denotations are used.

$d_1$: the diameter of the main pipe,
$d_2$: the diameter of the auxiliary pipe,
$\alpha$: the angle of intersection between the two pipes,
W: the point of intersection of projections of the axes $1a$ and $2a$ of the two pipes on a plane which is parallel to both of said main and auxiliary pipes,
3: a plane which contains the point W and is perpendicular to the auxiliary pipe,
4: a plane which contains the point W and is perpendicular to the main pipe,
5: a generatrix on the auxiliary pipe,
6: a generatrix on the main pipe having a common intersection point X on the joint line with the generatrix 5 on the auxiliary pipe,
$\theta$: the angle included by a plane containing the generatrix 5 and the axis $2a$ and another plane which contains said axis and is parallel to the axis $1a$ of the main pipe,
$\varphi$: the angle included by a plane containing the generatrix 6 on the main pipe and the axis $1a$ and a plane which contains said axis $1a$ and is parallel to the axis $2a$ of said auxiliary pipe, there being a relation between included angles $\theta$ and $\varphi$ as follows:

$$\frac{d_2}{2}\sin\theta = \frac{d_1}{2}\sin\varphi - d \qquad (1)$$

where $h$ denotes the perpendicular distance between the axis of the two pipes,
X: the point of intersection between the joint line between the pipes and the generatrix 5 on the auxiliary pipe,
Y: the point of intersection between the generatrix 5 on the auxiliary pipe and the plane 3,
Z: the point of intersection between the generatrix 6 of the main pipe and the plane 4.

Then, the joint line may be represented by $$Z_1 = XZ = \frac{d_2}{2}\operatorname{cosec}\alpha\cdot\cos\theta + \frac{d_1}{2}\cot\alpha\cos\varphi \qquad (2)$$

with respect to the main pipe 1, while by $$Z_2 = XY = \frac{d_2}{2} \cot \alpha \cdot \cos \theta + \frac{d_1}{2} \operatorname{cosec} \alpha \cos \varphi \quad (3)$$

with respeco to the auxiliary pipe 2.

FIG. 2 is a graph with $Z_1$ as ordinate and $$X_1 = \frac{d_1}{2} \varphi$$

an abscissa and shows a development line 7 of the joint line on the cylindrical surface of the main pipe.

FIG. 3 is a graph with $Z_2$ as ordinate and $$X_2 = \frac{d_2}{2} \theta$$

as abscissa and shows a development line 8 of the joint line on the cylindrical surface of the auxiliary pipe.

In FIG. 4 is diagrammatically shown an example of a mechanism including a combination of levers constructed in accordance with this invention for providing said analytical functions. Four levers AB, BC, DE and FG, each having a predetermined length as indicated are provided. The lever AB is connected at its one end B to the corresponding end of the lever BC, the other ends A and C of these levers being respectively positioned on two parallel lines $g_1$ and $g_2$ which are separated by a distance $h$. The point or end C is fixed while the joint A is adapted to be slidable along the line $g_1$. A prime mover M such as an electric motor, is provided to transmit its rotation to the lever AB through a shaft along the line $g_1$. In order to rotate levers DE and FG, respectively in synchronism with the levers BC and AB, ends D and F of the levers DE and FG are connected to the corresponding ends C and B of the levers BC and AB through shaft means P and Q, respectively. The point or end D is fixed while the other point E is adapted to be slidable along a vertical line R which is perpendicular to and moveable along a line $g_3$ which is parallel with lines $g_1$ and $g_2$. One end F of the lever FG is fixedly secured to a vertical line S which is parallel with and always at a fixed distance from the line R, while the other point or end G is adapted to slide along a vertical shaft T which is perpendicular to and slidable along a line $g_4$ which is also parallel to lines $g_1$ and $g_2$. This vertical shaft T serves as the output shaft on the extension of which is mounted a working tool U confronting the auxiliary or the main pipe to be worked which is driven in synchronism with either the lever AB or the lever BC to work the joint line.

The lengths of the levers AB and BC and the distance $h$ between the lines $g_1$ and $g_2$ may be made proportioned to $d_2/2$, $d_1/2$ and $h$, respectively.

Figure 5:
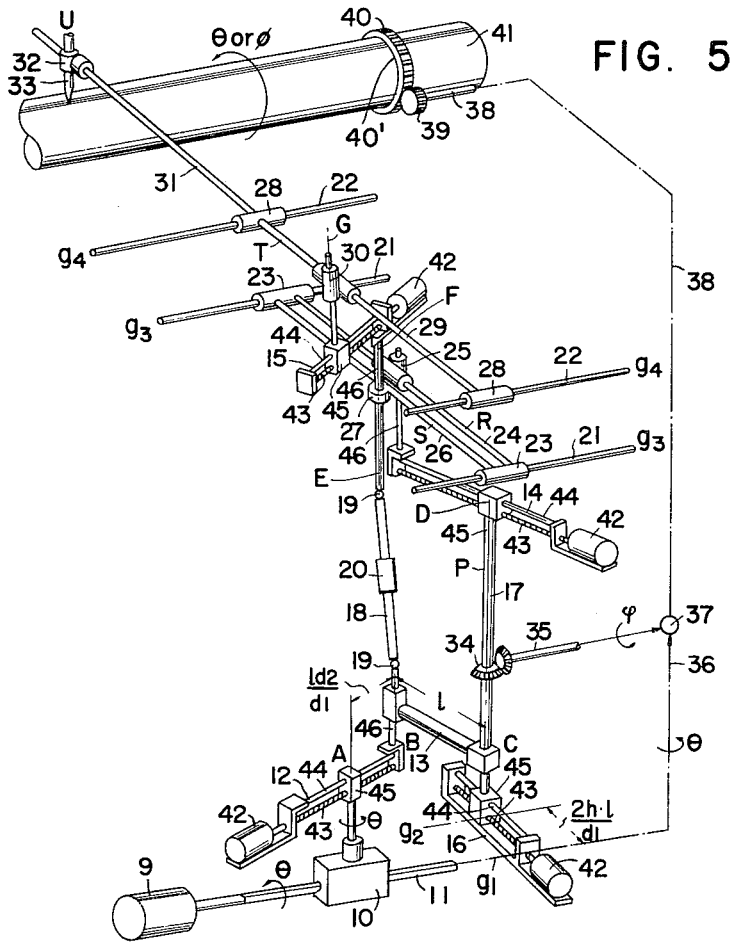
FIG. 5 is a perspective view, with parts cut off, showing one embodiment of this invention.

FIG. 5 is a perspective view of one embodiment of this invention which is schematically shown in FIG. 4. Levers 12 and 13 shown in FIG. 5 correspond to the lever mechanism employed to obtain the angular relations $\theta$ and $\varphi$ between levers AB and BC in FIG. 4, and levers 14 and 15 indicate a computing mechanism for the functions $Z_1$ and $Z_2$ which correspond to levers DE and FG of FIG. 4.

In FIG. 5, the reference numeral 9 designates a prime mover shown as an electric motor which is fixed on the base of the calculating unit and is provided with a speed reducing mechanism and a speed changing mechanism so as to be able to change its rotating speed freely. Rotation of the prime mover 9 imparts an angle of rotation $\theta$ in the aforementioned Equations 1, 2 and 3 to the rotational shaft 11 which corresponds to the base line indicated by the reference character $g_1$ in FIG. 4. The sliding block 10 slides along the rotational shaft 11 and simultaneously transmits the angle of rotation $\theta$ to the lever 12 having its center of rotation on the said sliding block 10 positioned on the base line $g_1$. In this case, the angle $\theta$ of the lever 12 is given as the angle to the rotational shaft 11, or, the base line $g_1$. Numeral 13 designates a fixed lever having a length $l$ and rotating horizontally, one end of which is connected with the lever 12 by a pin and the other end of which has its center of rotation on the guide mechanism 16 whose pivot moves in parallel with the base line $g_1$. FIG. 4 indicates a relation of the pivotal position of the lever 16 with respect to the base line 16.

The aforementioned Equation 1

$$\frac{d_2}{2} \sin \theta = \frac{d_1}{2} \sin \phi - h$$

can be modified to:

$$\frac{d_2}{1} \sin \theta = \sin \phi - \frac{2h}{d_1}$$

which can further be modified to the following equation:

$$\frac{d_2 l}{d_1} \sin \theta = l \sin \phi - \frac{2h \cdot l}{d_1} \quad (4)$$

From the above, it becomes apparent that the link mechanism which comprises the levers 12 and 13 can be constructed in accordance with the Equation 4 that has been derived from the Equation 1. Now assuming that the lengths of the lever 12 (AB) and 13 (BC) in the said link mechanism and the amount of eccentricity of the lever 13 in the guide mechanism 16, i.e., horizontal distance between $g_1$ and $g_2$ are made $d_2 l/d_1$, $l$, and $2h \cdot l/d_1$, respectively, an angle of rotation $\phi$ is induced to the lever 13 by the angle of rotation $\theta$ of the lever 12 as can be seen from said Equation 4. The angle of rotation $\phi$ is given as the angle of the base line $g_1$, i.e., the angle of the lever 13 to the line $g_2$ which is parallel to $g_1$.

The lengths of the lever 12 and 13 represente by AB and BC have the following relation:

$$AB = \frac{d_2 l}{d_1} < l$$

$$BC = l$$

where $d_2$ is always smaller than $d_1$ ($d_2 < d_1$). When the maximum length of the lever 12 is set at $l$, it becomes possible to prevent the link mechanism from damage due to erroneous setting of the length of the levers. The numeral 17 designates a vertical shaft which corresponds to the shaft P in FIG. 4 and is adapted to transmit the angle of rotation $\phi$ produced in the lever 13 to the lever 14 fixed on the top end of the vertical shaft 17 in parallel with the lever 13. A vertical shaft 18 is provided with flexible universal joints 19 and a splined shaft extension 20 in its middle portion so as to be flexible with respect to the horizontal movement of the supporting pivots of the levers 12 and 15, and is capable of constantly transmitting to the lever 15 the angle of rotation $\theta$ of the lever 12 irrespective of the relative position of the supporting pivots of the levers 12 and 15 as well as variations in length between the two pivots. Rails 21 and 22 fixed horizontally and in parallel with the base line $g_1$ correspond to the lines $g_3$ and $g_4$ of FIG. 4. A movable block or carriage 23 is joined integrally with a transverse rail 24, which corresponds to R in FIG. 4 and is disposed horizontally as well as vertically with respect to the rail 21, and is adapted to be slidable along the rail 21. A pivot 25 of the lever 14 corresponding to the point E in FIG. 4 slides along the transverse rail 24 and horizontal rotational movement of the pivot 25 due to rotation of the lever 14 is divided into two directions by vertically intersecting coordinates consisting of the rail 21 and the transverse rail 24. Numerals 26 and 27 designates supporting means of the lever 15 on the carriage composed of 23 and 24, i.e., a supporting beam and a fixed supporting point, which correspond to S and F in FIG. 4, respectively. A movable block or carriage 28 has a transverse rail 29, which corresponds to the shaft T of FIG. 4 and is disposed horizontally as well as vertically wtih respect to a rail 22, and is slidably guided by the rail 22. The horizontal rotational movement of a pivot 30 due to rotation of the lever 15 is divided into two directions by vertically intersecting coordinates consisting of the rail 22 and the transverse rail 29. Thus, it will be noted that, when the lengths of the levers 14 and 15 are made DE and FG, respectively, they are denoted by the following equation as understood from FIG. 4:

$$m = DE \cos \phi$$
$$n = FG \cos \theta$$

and, the amount of movement of the transverse rail 29, i.e., the amount of movement of the slidable block 28 along the rail 22 becomes equal to the summation of DE cos $\phi$ and FG cos $\theta$, the lengths of the respective levers in the direction of the base line $g_1$ owing to rotation of the levers 14 and 15. A working tool holding arm 31 has one end fixed to the slidable block 28 and serves to transmit the position of the slidable block 28, i.e.

$$m + n = DE \cos \phi + FG \cos \theta$$

to a working tool 33, e.g. flame cutting tool, corresponding to the tool U in FIG. 4 through a tool holder 32. At an intermediate point of the vertical shaft 17 is secured a bevel gear means 34 adapted to transmit to a shaft 35 the angle of rotation $\phi$ of the vertical shaft 17 which is subjected to rotation by the angle of rotation $\phi$ produced to the lever 13. As schematically shown in FIG. 5, a vertical shaft 36 with its lower end directly connected to the rotating shaft 11 of the lever mechanism to transmit the angle of rotation $\theta$, and a horizontal shaft 35 to transmit the angle of rotation $\phi$, transmit, through a selected mechanism 37 including clutches, the angle of rotation $\theta$ of the shaft 36 or the angle of rotation $\phi$ of the shaft 35 to an output shaft 38 which transmits rotational motion of the shaft 35 or 36 to the pipe 41 to be worked. A pinion 39 secured on the other end of the output shaft 38 meshes with a ring gear 40 secured at the outer periphery of a chuck 40' which clamps the pipe 41 to be worked parallel to the base lines $g_1$, $g_2$, $g_3$ and $g_4$ of the lever mechanism, and transmits the angle of rotation $\theta$ or $\phi$ of the shaft 38 to the pipe 41 to be worked.

Numerals 42 through 46 designate generally the motor operated lever mechanism wherein 42 designates an electric motor, 43 a screw threaded rod, 44 guide rail for the combined supporting frame and the movable block for the screw threaded rod, 45 a movable pivot, and 46 a fixed pivot.

In this way, when the angle $\theta$ in the Equations 1, 2, and 3 of the said pipe joint line is given to the lever 12, an angle of rotation which is induced to the lever 13 becomes $\phi$ in the Equation 1, whereby the angles of rotation $\theta$ and $\phi$ are transmitted to the levers 14 and 15 connected to the levers 12 and 13, respectively.

In case of cutting a branch pipe in accordance with the Equations 1 and 3, when the following values are given to the respective members;

$$\text{Length of lever } 12 = \frac{d_2 l}{d_1}$$

$$\text{Length of lever } 14 = \frac{d_1}{2} \operatorname{cosec} \alpha$$

$$\text{Length of lever } 15 = \frac{d_2}{2} \cot \alpha$$

$$\text{Distance between } g_1 \text{ and } g_2 = \frac{2h \cdot l}{d_1}$$

and the angle of rotation $\theta$ of the shaft 11 of the lever 12 is transmitted to the pipe 41 to be worked, the amount the carriage 28 is shifted satisfies the Equation 3, causes the working tool 33 to move in the axial direction of the pipe 41 to be worked, and performs cutting of a joint line in combination with the rotation of the pipe 41 to be worked.

In case of cutting a main pipe, when the following values are given to the respective members;

$$\text{Length of lever } 12 = \frac{l d_2}{d_1}$$

$$\text{Length of lever } 14 = \frac{d_1}{2} \cot \alpha$$

$$\text{Length of lever } 15 = \frac{d_2}{d_1} \operatorname{cosec} \alpha$$

$$\text{Distance between } g_1 \text{ and } g_2 = \frac{2h \cdot l}{d_1}$$

and the angle of rotation $\phi$ induced in the lever 13 is transmitted to the pipe 41 to be worked, the amount the working tool 33 is shifted in the axial direction of the pipe 41 becomes equal to the abovementioned Equation 2 and performs cutting of a joint line in combination with the rotation of the pipe 41 to be worked In FIG. 6 is illustrated an example of a lever mechanism driven by an electric motor 47, which comprises a reduction gear train 48, a screw threaded rod 49, a metal member 53 for the movable pivot, and a movable nut 50 engaged with the said screw threaded rod 49 connected to the said metal member. The mechanism also comprises a guide rail 51 for the combined supporting frame and movable block for the lever, said guide rail being integrally united with other components of the mechanism by means of a coupling device 52. The lever mechanism is supported by a fixed-axis, rotatable shaft 54. Numerals 55 through 59, inclusive, designate a mechanism for feeding electric power, comprising a holder 56 for a carbon brush 57, a fixed frame 55 adapted to support said brush holder, and a collector disc 58 of insulating material secured to and rotatable with the rotating shaft 54, and a conductive collector ring 59 secured to said disc through which electric current is supplied to the electric motor 47.

In operation the electric motor 42 of each motor operated lever mechanism is energized to adjust the position of the pivot 45 to provide for the respective lever mechanism the required effective length as indicated which satisfies the above mentioned Equations 2 and 3. Then the driving motor 9 is energized to rotate the pipe 41 to be worked at the angular speed of $\theta$ or $\phi$ by the selective action of the clutch 37 and also to move said tool 33 toward the axis of the pipe 41, thereby to precisely work the joint line.

Thus, in accordance with this invention, in setting the length of the levers, it is not necessary to set them by manual operation, the levers being automatically set to have required effective lengths by merely adjusting the positions of the carriages 10, 23 and 28 so as to make $\theta = 0$.

In other words, by setting the carriage 10 at a position of $$\frac{d_2}{d_1} \times l \text{ (length of AB)}$$

the carriage 23 at $$\frac{d_1}{2} \operatorname{cosec} \alpha \text{ (length of ED)}$$

in the case of end cutting, or, at $$\frac{d_1}{2} \cot \alpha \text{ (length of ED)}$$

in the case of hole cutting, the carriage 28 at $$\frac{d_2}{2} \cot \alpha \text{ (length of GF)}$$

in the case of end cutting, or, at $$\frac{d_2}{2} \operatorname{cosec} \alpha \text{ (length of GF)}$$

in the case of hole cutting, and by establishing a distance in the vertical direction to the levers 12, 13, 14 and 15, and the shaft 11 of the sliding block 10 at $$\frac{2h \cdot l}{d_1}$$

for providing a desired eccentricity. The apparatus of this invention can be easily set to precisely cut the joint line of the required contour, and the time and labor involved in readjusting the lever mechanism for cutting the connecting line for pipes of different diameter can be greatly reduced.

In this way, when the conditions for connecting pipes, i.e., diameter of main pipe $d_1$, diameter of branch pipe $d_2$, intersecting angle $\alpha$, and eccentricity $h$ of the axes of two pipes, are given, the following values can be established with respect to the levers 12, 14, 15 and the guide mechanism 16:

In the case of cutting a main pipe:

$$\text{Lever } 12 = \frac{d_2 l}{d_1}$$

$$\text{Lever } 14 = \frac{d_1}{2} \cot \alpha$$

$$\text{Lever } 15 = \frac{d_2}{2} \operatorname{cosec} \alpha$$

$$\text{Distance } g_1 - g_2 = \frac{2h \cdot l}{d_1}$$

In the case of cutting a branch pipe:

$$\text{Lever } 12 = \frac{d_2 l}{d_1}$$

$$\text{Lever } 14 = \frac{d_1}{2} \operatorname{cosec} \alpha$$

$$\text{Lever } 15 = \frac{d_2}{2} \cot \alpha$$

$$\text{Distance } g_1 - g_2 = \frac{2h \cdot l}{d_1}$$

According to the apparatus of the present invention, since all the setting levers are motor-operated, and length of these levers, at the position of $\theta = 0$, can be replaced with the shifting amount of the carriages 10, 23, 28, respectively, easy and accurate setting of the positions can be made possible by an indicator means.

While the invention has been described for the purpose of joining or connecting a pair of pipes of different diameters, it should be understood that the invention is equally applicable also in joining cylindrical bodies having the same or different diameters. It should also be understood that various changes can be made in the lever mechanism without departing from the spirit and scope of the invention, whereby it is intended to cover in the appended claims all such modifications which fall within the true spirit and scope of the invention.

What is claimed is:

1. Method of working a joint line between first and second pipes which are to be joined together at an angle along said joint line, comprising the steps of: representing said joint line by a function $Z = f(\theta \cdot \varphi)$ of the circular cylindrical coordinates utilizing the axes of said first and second pipes as coordinate axes, $\theta$ and $\varphi$ being angular variables and having a relationship represented by an equation $$\frac{d_2}{2} \sin \theta = \frac{d_1}{2} \sin \varphi - h$$

wherein $d_1$ and $d_2$ denote the diameters of the first and second pipes, respectively, and $h$ denotes the perpendicular distance between the axes of said first and second pipes; obtaining the value of said function by utilizing a mechanism including a combination of levers; mounting a working tool on the output shaft of said mechanism; moving said working tool along a straight line in the direction of the axis of the pipe to be worked; rotating said pipe to be worked or said working tool at an angle of $\theta$ or $\varphi$ thereby to work said joint line, and automatically setting the length of said levers by means of electric power means.

2. An apparatus for working a joint line between first and second pipes which are to be joined together at an angle along said joint line, comprising: a mechanism including a combination of levers for obtaining a function $Z = f(\theta \cdot \varphi)$ of the circular cylindrical coordinates utilizing the axes of said first and second pipes as coordinate axes to represent said joint line, $\theta$ and $\varphi$ being angular variables and having a relationship represented by an equation $$\frac{d_2}{2} \sin \theta = \frac{d_1}{2} \sin \varphi - h$$

wtherein $d_1$ and $d_2$ denote the diameters of the first and second pipes, respectively, and $h$ denotes the perpendicular distance between the axes of said first and second pipes; a working tool mounted on the output shaft of said lever mechanism; means to move said working tool along a straight line in the direction of the axis of said pipe to be worked; means to rotate said pipe to be worked or said working tool at angle $\theta$ or $\varphi$ thereby to work said joint line; and electric means to automatically set the lengths of the levers of said lever mechanism.

3. The apparatus for working a joint line between a first pipe and a second pipe according to claim 2, wherein said lever mechanism comprises first, second and third levers having effective length of $$\frac{l d_2}{d_1}, \frac{d_2}{2} \cot \alpha$$

and $$\frac{d_1}{2} \operatorname{cosec} \alpha$$

respectively; a guide mechanism for providing eccentricity between the said first and second pipes having effective length of $$\frac{2h \cdot l}{d_1}$$

these four members being combined to satisfy the function $$Z_1 = xy = \frac{d_2}{2} \operatorname{cosec} \alpha \cos \theta + \frac{d_1}{2} \cot \alpha \cos \phi$$

for the first pipe, and the function $$Z_2 = xy = \frac{d_2}{2} \cot \alpha \cos \theta \frac{d_1}{2} \operatorname{cosec} \alpha \cos \phi$$

for the second pipe; and motor-operated means provided for varying the effective length of the said respective levers and guide mechanism for providing the eccentricity between the first and second pipes.

4. The apparatus for working a joint line between a first pipe and a second pipe according to cliam 2, wherein said lever mechanism comprises first, second and third levers having effective length of $$\frac{l d_2}{d_1}, \frac{d_2}{2} \operatorname{cosec} \alpha$$

and $$\frac{d_1}{2} \cot \alpha$$

respectively; a guide mechanism for providing eccentricity between the said first and second pipes having effective length of $$\frac{2h \cdot l}{d_1}$$

these four members being combined to satisfy the function $$Z_1 = xy = \frac{d_2}{2} \operatorname{cosec} \alpha \cos \theta + \frac{d_1}{2} \cot \alpha \cos \phi$$

for the first pipe, and the function $$Z_2 = xy = \frac{d_2}{2} \cot \alpha \cos \theta + \frac{d_1}{2} \operatorname{cosec} \alpha \cos \phi$$

for the second pipe; and motor-operated means provided for varying the effective length of the said respective levers and guide mechanism for providing the eccentricity between the first and second pipes.

References Cited by the Examiner
UNITED STATES PATENTS

| | | | |
|---|---|---|---|
| 3,073,195 | 1/63 | Koster | 83—581 X |
| 3,120,143 | 2/64 | Kreider | 83—581 X |

ANDREW R. JUHASZ, *Primary Examiner.*

LEON PEAR, *Examiner.*